(No Model.)

I. N. GLAUBER.
HOSE STRAP.

No. 397,180. Patented Feb. 5, 1889.

WITNESSES.

INVENTOR.
I. N. Glauber
By Leggett & Leggett
ATTORNEYS

UNITED STATES PATENT OFFICE.

ISAAC N. GLAUBER, OF CLEVELAND, OHIO.

HOSE-STRAP.

SPECIFICATION forming part of Letters Patent No. 397,180, dated February 5, 1889.

Application filed September 29, 1888. Serial No. 286,745. (No model.)

*To all whom it may concern:*

Be it known that I, ISAAC N. GLAUBER, of Cleveland, in the county of Cuyahoga and State of Ohio, have invented certain new and useful Improvements in Hose-Straps; and I do hereby declare the following to be a full, clear, and exact description of the invention, such as will enable others skilled in the art to which it pertains to make and use the same.

My invention relates to improvements in hose straps or clamps for fastening the hose onto the coupling.

My improved hose-strap consists, primarily, of a wire ring, preferably large enough to pass easily over the largest part of the coupling. The wire ring, having been placed in position on the hose, is drawn against the one side of the hose, and the opposite or slack side of the ring is then twisted a half-turn, after which the loop thus formed is distended to draw the wire tight around the hose, and while the wire is thus strained another half-turn is given in the same direction as before to complete the twisting or locking. The idle loop may then be bent down alongside the hose, so as to be out of the way.

The object is to provide a cheap and efficient fastening that can be easily applied.

Figure 1:
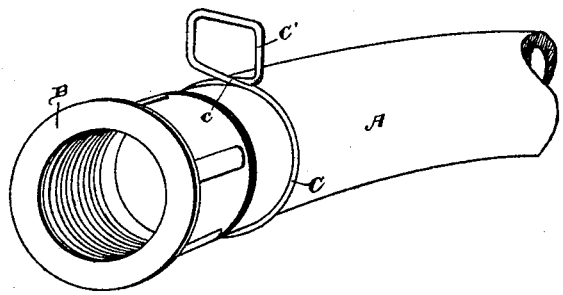
Figure 2:
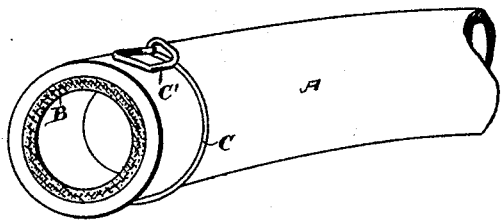
Figure 3:
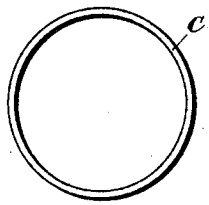
Figure 4:
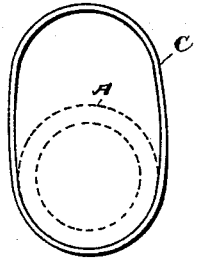

In the accompanying drawings, Figures 1 and 2 are views in perspective. Figs. 3 and 4 are elevations.

A represents the hose, and B a member of the coupling. The hose-strap C consists of a wire ring. This ring may be round, as shown in Fig. 3, or may be oblong—for instance, as shown in Fig. 4; but in any case the ring, for convenience, should be of such size and shape that it will readily pass over the largest part of the coupling. The parts having been assembled approximately in the position shown in Figs. 1 and 2, the wire ring is drawn against the one side of the hose and the opposite or loose side of the ring is given a half turn or twist to cross the wires, as shown at c, Fig. 1, thus forming a loop, C', of the slack wire. Loop C' is then distended to draw the wire tight around the hose, after which another half turn or twist is given in the same direction to complete the twisting or fastening, as shown in Fig. 2, after which the loop may be turned down alongside of the hose, so as to be out of the way. (See Fig. 2.)

The ease and dispatch with which this hose-strap may be applied and the small initial cost thereof are among its chief recommendations.

What I claim is—

A hose-strap consisting of an endless wire ring of greater diameter than the hose and embracing the hose, the slack portion of the ring being crossed and twisted to form an endless hose-strap and an endless loop, substantially as set forth.

In testimony whereof I sign this specification, in the presence of two witnesses, this 25th day of July, 1888.

ISAAC N. GLAUBER.

Witnesses:
W. E. DONNELLY,
ALBERT E. LYNCH.